United States Patent
Gould et al.

(10) Patent No.: US 8,058,222 B2
(45) Date of Patent: Nov. 15, 2011

(54) PROCESS FOR MANUFACTURING EXTRUDED ALKYL SULFATE PARTICLES

(75) Inventors: Paul Anthony Gould, Cheshire (GB); Hao Hu, Beijing (CN); Machiel Jacob Nelemans, Sint Lambrechts Woluwe (BE); SiCong Hou, Beijing (CN)

(73) Assignee: The Procter & Gamble Company, Cincinnati, OH (US)

( * ) Notice: Subject to any disclaimer, the term of this patent is extended or adjusted under 35 U.S.C. 154(b) by 6 days.

(21) Appl. No.: 12/504,084

(22) Filed: Jul. 16, 2009

(65) Prior Publication Data

US 2010/0022430 A1     Jan. 28, 2010

(30) Foreign Application Priority Data

Jul. 28, 2008  (EP) .................................. 08161295

(51) Int. Cl.
*C11D 11/00*  (2006.01)
*C11D 1/12*   (2006.01)
*B29C 47/78*  (2006.01)

(52) U.S. Cl. .................... 510/451; 510/495; 264/148

(58) Field of Classification Search .................. 510/451, 510/495; 264/148
See application file for complete search history.

(56) References Cited

U.S. PATENT DOCUMENTS

| | | | |
|---|---|---|---|
| 4,087,368 A * | 5/1978 | Borrello ...................... 510/306 |
| 4,228,042 A | 10/1980 | Letton |
| 4,239,660 A | 12/1980 | Kingry |
| 4,260,529 A | 4/1981 | Letton |
| 4,430,243 A | 2/1984 | Bragg |
| 4,483,779 A | 11/1984 | Llenado et al. |
| 4,483,780 A | 11/1984 | Llenado |
| 4,565,647 A | 1/1986 | Llenado |
| 4,585,642 A | 4/1986 | Rieck |
| 4,820,439 A | 4/1989 | Rieck |
| 4,950,310 A | 8/1990 | Rieck et al. |
| 5,045,238 A * | 9/1991 | Jolicoeur et al. ............. 510/351 |
| 5,188,769 A | 2/1993 | Connor et al. |
| 5,332,528 A | 7/1994 | Pan et al. |
| 5,399,297 A | 3/1995 | Panthal et al. |
| 5,451,354 A * | 9/1995 | Aouad et al. .................. 264/117 |
| 5,576,282 A | 11/1996 | Miracle et al. |
| 5,620,952 A | 4/1997 | Fu et al. |
| 5,783,548 A | 7/1998 | Fredj et al. |
| 5,814,596 A * | 9/1998 | Aquad et al. .................. 510/444 |
| 6,004,922 A | 12/1999 | Watson et al. |
| 6,020,303 A | 2/2000 | Cripe et al. |
| 6,022,844 A | 2/2000 | Baillely et al. |
| 6,093,856 A | 7/2000 | Cripe et al. |
| 6,136,769 A | 10/2000 | Asano et al. |
| 6,150,322 A | 11/2000 | Singleton et al. |
| 6,153,577 A | 11/2000 | Cripe et al. |
| 6,172,033 B1 * | 1/2001 | Goovaerts et al. ............. 510/444 |
| 6,221,825 B1 | 4/2001 | Williams, Jr. et al. |
| 6,281,188 B1 * | 8/2001 | Kandasamy et al. ......... 510/444 |
| 6,306,812 B1 | 10/2001 | Perkins et al. |
| 6,326,348 B1 | 12/2001 | Vinson et al. |
| 6,482,994 B2 | 11/2002 | Scheper et al. |
| 6,844,309 B1 | 1/2005 | Sivik et al. |

FOREIGN PATENT DOCUMENTS

| | | |
|---|---|---|
| EP | 0 724 620 B1 | 2/1999 |
| WO | WO 92/06162 A1 | 4/1992 |
| WO | WO 98/35002 A1 | 8/1998 |
| WO | WO 98/35003 A1 | 8/1998 |
| WO | WO 98/35004 A1 | 8/1998 |
| WO | WO 98/35005 A1 | 8/1998 |
| WO | WO 98/35006 A1 | 8/1998 |
| WO | WO 99/32599 A1 | 7/1999 |
| WO | WO 00/47708 A1 | 8/2000 |
| WO | WO 2006/087108 A1 | 8/2006 |

OTHER PUBLICATIONS

International Search Report, 7 Pages, (PCT/US2009/050617) mailed on Nov. 25, 2009.

* cited by examiner

*Primary Examiner* — Lorna M Douyon
(74) *Attorney, Agent, or Firm* — Julie A. McConihay; Leonard W. Lewis; Steven W. Miller

(57) ABSTRACT

Process for manufacturing particles, the process comprising the steps of: feeding a feed material comprising from 40 to 70% of alkyl sulfate surfactant(s) and from 12 to 30% of water to an extruder comprising an extrusion head, mechanically working and cooling the feed material within the extruder to form an extrudable mass, extruding the extrudable mass through the extrusion head to form strand(s), and forming particles from the strand(s), wherein the alkyl sulfate surfactant(s) comprise at least 50% of $C_6$-$C_{14}$ alkyl sulfate surfactant(s).

2 Claims, No Drawings

US 8,058,222 B2

PROCESS FOR MANUFACTURING EXTRUDED ALKYL SULFATE PARTICLES

FIELD OF THE INVENTION

The present invention concerns a process for manufacturing extruded alkyl sulfate particles and the extruded particles themselves.

BACKGROUND OF THE INVENTION

Detergent composition and in particular laundry detergent composition may comprise alkyl sulfate surfactants. The alkyl sulfate surfactants are generally obtained by sulfatation of the corresponding alcohol which may for example be derived from palm kernel oil.

Some alkyl sulfate surfactant(s) are available in liquid, paste, or powder form. Some alkyl sulfate may also be available under an extruded particle form. An extruded particle form may in particular be suitable to improve the handling properties of the material while lowering or not increasing too much the cost of manufacturing or shipping.

Extruded particle may be obtained by feeding a feed material in an extruder, the feed material may then be mechanically worked to form an extrudable mass which is extruded.

WO 99/32599 discloses methods of manufacturing particles comprising sulfated or sulphonated surfactant. The methods disclosed may comprise the feeding of the feed material under a solid or dried form and the heating of the extrudable mass prior to its extrusion.

The inventors have now surprisingly found that particles comprising alkyl sulfate surfactant having right physical characteristics for dissolution, caking, and attrition could be obtained by a specific extrusion process. This process may not require the presence of a drying step of the feeding material prior to its introduction in the extruder and/or may not require the heating of the extrudable mass prior to its extrusion.

SUMMARY OF THE INVENTION

In one embodiment of the present invention, the invention concerns a process for manufacturing particles, the process comprising the step of: feeding a feed material comprising from 40 to 70% of alkyl sulfate surfactant(s) and from 12 to 30% of water to an extruder comprising an extrusion head, mechanically working and cooling the feed material within the extruder to form an extrudable mass, extruding the extrudable mass through the extrusion head to form strand(s), and forming particles from the strand(s), wherein the alkyl sulfate surfactant(s) comprise at least 50% of $C_6$-$C_{14}$ alkyl sulfate surfactant(s).

According to an exemplary embodiment of the invention, the particles are indirectly formed from the strand(s). The material extruded from the extruder is further processed in a second extruder and the particles are formed from the strands extruded from the second extruder.

As such, the process of the invention may comprise the steps of: feeding a feed material comprising from 40 to 70% of alkyl sulfate surfactant(s) and from 12 to 30% of water to an extruder comprising an extrusion head, mechanically working and cooling the feed material within the extruder to form an extrudable mass, extruding the extrudable mass through the extrusion head to form strand(s) of extruded material, feeding the extruded material to a second extruder comprising an extrusion head, mechanically working the feed material within the second extruder to form an extrudable mass, extruding the extrudable mass through the extrusion head to form strand(s), and forming particles from the strand(s), wherein the alkyl sulfate surfactant(s) comprise at least 50% of $C_6$-$C_{14}$ alkyl sulfate surfactant(s).

Surprisingly, the inventors have found that particles having a suitable dissolution rate and right caking and attrition characteristics could be obtained by the process of the invention, even if the feed material was not previously dried or fed under a solid form and even without heating the material during the extrusion process. The inventors have also found that the process of the invention and in particular the choice of specific alkyl sulphate surfactant(s) could lead to particles comprising a high proportion of alkyl sulfate surfactants, being easily handable, directly usable, in particular not requiring to be cooled before handling.

In one embodiment, the invention concerns an extruded particle obtained via a process of the invention. Those extruded particles may comprise from 50 to 80% of alkyl sulfate surfactant(s) and/or from 5 to 15% of water and/or may be coloured.

The invention also concerns, according to another aspect, an extruded particle comprising at least 50% of $C_6$-$C_{14}$ alkyl sulfate surfactant(s).

DETAILED DESCRIPTION OF THE INVENTION

The invention concerns the feeding of a feed material in an extruder to form an extrudable mass which is extruded.

The feed material comprise from 40 to 70% of alkyl sulfate surfactant(s). Typically the feed material comprises at least at least 45, 50 or even 55% of alkyl sulfate surfactant(s). Typically the feed material comprises less than 65, or 60 or less than 55% of alkyl sulfate surfactant(s).

The alkyl sulfate surfactant(s) comprises $C_6$-$C_{18}$ alkyl sulfate surfactant(s) which may be of formula $R_2$—O—$SO_3^-$ $M^+$, with $R_2$ being a linear or branched, typically linear, substituted or unsubstituted, typically unsubstituted, optionally alkoxylated, $C_6$-$C_{18}$ alkyl and with $M^+$ being a proton or a cation which provides charge neutrality.

Alkyl sulfate surfactant(s) of formula $R_2$—O—$SO_3^-$ $M^+$ may constitute at least 50, for example at least 60 or 70 or even 80 or 90% of the alkyl sulfate surfactant(s) present in the feed material.

The alkyl sulfate surfactant comprises $C_6$-$C_{14}$ alkyl sulfate surfactant(s) which may be of formula $R_1$—O—$SO_3^-$ $M^+$, with $R_1$ being a linear or branched, typically linear, substituted or unsubstituted, typically unsubstituted, optionally alkoxylated, $C_6$-$C_{14}$ alkyl and with $M^+$ being a proton or a cation which provides charge neutrality.

Alkyl sulfate surfactant(s) of formula $R_1$—O—$SO_3^-$ $M^+$ constitute at least 50, for example at least 60 or 70 or even 80 or 90% or 95% or 98% of the alkyl sulfate surfactant(s) present in the feed material.

Alkyl sulfate surfactant(s) of formula $R_1$—O—$SO_3^-$ $M^+$ may constitute at least 50, for example at least 60 or 70 or even 80 or 90% or 95% or 98% of the alkyl sulfate surfactant(s) of formula $R_2$—O—$SO_3^-$ $M^+$.

Alkyl sulfate surfactant(s) of formula $R_1$—O—$SO_3^-$ $M^+$ are constituted of $C_{6-14}$ alkyl sulfate surfactant(s), in particular are constituted of $C_{8-14}$, $C_{10-14}$, or even $C_{12-14}$ alkyl sulfate surfactant(s).

According to one embodiment of the invention, the alkyl sulfate surfactant(s) is not alkoxylated. Higher concentration of alkyl sulfate may be obtained if the alkyl sulfate is not alkoxylated. The compositions of the invention may also comprise alkoxylated, for example ethoxylated and/or propyloxylated, alkyl sulfate surfactant(s). The compositions of the invention may comprise both non alkoxylated and alkoxylated alkyl sulfate surfactants. The compositions may comprise at least two alkoxylated sulfate surfactant(s) with different degree of alkoxylation. The alkoxylated alkyl sulfate surfactant(s) may be alkoxylated with 0.1 to 9 moles or from 0.1 to 3, or from 0.2 to 1.5, typically from 0.3 to 0.9 moles of $C_{1-4}$ alkylene oxide per mole of alkyl sulfate. The alkoxylated alkyl sulfate surfactant(s) may be alkoxylated with 0.8 to 3.5 moles of $C_{1-4}$ alkylene oxide per mole of alkyl sulfate.

$M^+$ may be a proton or a cation such as a sodium, calcium, potassium, or magnesium cation, in particular a sodium cation.

The alkyl sulfate surfactant(s) may be obtained by the sulfatation of the corresponding alcohol(s). The required carbon chain length distribution can be obtained by using alcohols with the corresponding chain length distribution prepared synthetically or from natural raw materials or corresponding pure starting compounds.

According to one embodiment of the invention, there is no drying step between the preparation of the alkyl sulfate surfactant(s) from the corresponding alcohols and its feeding in the extruder as a feed material. For example, at least 50%, or 70%, or 80%, or even 90 or 95% or even 100% of the amount of water present during the sulfatation step is still present in the feed material Typically, the alkyl sulfate surfactant(s) is derived from palm kernel oil or coconut oil.

The feed material also comprise from 12 to 30% by weight of water. Typically the feed material comprises at least 15, or 17 or at least 19, 21 or even 23% of water. Typically the feed material comprises less than 30, or 26 or less than 23% of water.

At least 50%, or 70%, or 80%, or even 90, or 95%, of the amount of water present in the feed material may be water used during the preparation of the alkyl sulfate surfactant(s) by sulphatation of the corresponding alcohols.

The weight ratio of alkyl sulfate surfactant(s) to water in the feed material may be comprised between 0.5 and 10, or 1 and 5, or even 1.5 to 4, preferably between 2 and 3 or between 2.2 and 2.5.

The feed material may also comprise a carrier, such as an inorganic salt. The feed material may comprise from 0.1 to 58% or from 1 to 40, from 2 to 35, from 8 to 30, or even from 16 to 25% of carrier, such as an inorganic salt.

The carrier may be a builder. The carrier may be an inorganic salt for example a sodium salt. The inorganic salt comprises for example a polyphosphate salt, such as sodium tripolyphosphate or sodium pyrophosphate, a carbonate salt, a bicarbonate salt, a sesquicarbonate salt, a silicate, disilicate of metasilcate salt, a borate salt, a sulfate salt, and mixtures thereof. In particular, the inorganic salt may comprise sodium sulfate, sodium carbonate, and mixture thereof. The carrier may also comprise zeolite.

The feed material may comprise a colorant which may be to provide coloured particles for aesthetic reasons or maybe to provide a hueing or blueing agent. In particular, the feed material may comprise a hueing dye. The hueing dye may be a water soluble or water dispersible compound which upon washing provides white fabrics with a light off-white tint, modifying whiteness appearance and acceptance (e.g. providing aqua, or blue, or violet, or pink hue). The colorant may be a dye or a pigment. It is particularly preferred that the feed material comprise a colorant if the particles obtained by the extrusion of the feed material are to be used as aesthetic particles, for example in a detergent composition.

The feed material is fed in an extruder. In this specification, this extruder will be referred to as "the extruder" or, when several extruders are used, as "the first extruder".

The feed material may be fed in the extruder at a temperature of at least 30° C., 35° C., 40° C., 45° C., or at least 50° C., 55° C., or 60° C. The feed material may be fed in the extruder at a temperature of at most 80° C. or 70° C. or 60° C. The alkyl sulfate may be fed in the extruder at a temperature of at least 30° C., 35° C., 40° C., 45° C., or at least 50° C., 55° C., or 60° C.

The feed material may be fed as a solid or plastic or molten form. Preferably, the alkyl sulphate is fed in the form of a paste.

The feed material may be fed in whatever way is most convenient, for examples in lumps or shavings, or poured or pumped in.

The extruder comprises an extrusion head. The extrusion head may be an axial or radial extrusion head. The extrusion head may comprise a multiplicity of extrusion apertures. The apertures may be cylindrical and may have a diameter comprised between 0.2 to 4 mm, for example between 0.4 and 3 mm or between 0.6 and 2 mm or between 0.8 and 1.5 mm. The apertures may also have a diameter comprised between 2 mm and 40 mm, for example between 4 mm and 20 mm or between 8 and 13 mm. Bigger apertures may be preferred if a second extruder is used. The extruder may be a screw extruder, in particular a twin screw extruder.

The feed material is mechanically worked within the extruder to form an extrudable mass. The extrudable mass may be in a pasty, plastic and/or semi-solid and/or solid form. The extrudable mass may in particular be in a plastic and/or semi-solid form immediately prior the extrusion.

The feed material is cooled within the extruder. Because heat is generated by the mechanical working it is possible that the temperature of the feed material, even if it is cooled, does not significantly decrease, or even slightly increases, between the time it is fed in the extruder and the time it exits the extruder.

As such, by "the feed material is cooled within the extruder", it should be understood that either the extruder has a cooling capability which limits the increase of temperature (due to the mechanical working of the extruder) of the fed material inside the extruder or that in at least one location inside the extruder, the feed material has a temperature below the temperature at which the fed material was fed into the extruder.

The extruder may have a cooling capability which means that the extruder has means to cool the fed material, such means having a significantly higher cooling capability than the air at ambient temperature surrounding the extruder. For example, the extruder may be a water cooled extruder. The water may circulate in a jacket of the extruder and may have a temperature between 1 and 33° C., for example between 3 and 20° C.

The feed material may be cooled of at least 1° C., or 2° C., or 3° C., or 5° C., 10° C. or 15° C., 20° C. or even 25° C. or 30° C., 35° C. or 40° C. within the extruder. The difference of temperature between the temperature at which is fed the feed material to the extruder and the temperature of the extrudable mass immediately prior to its extrusion is typically of at least 1° C., or 2° C., or 3° C., or 5° C., 10° C. or 15° C., 20° C. or even 25° C. or 30° C., 35° C. or 40° C. The difference of temperature between the temperature at which is fed the alkyl sulfate to the extruder and the temperature of the extrudable mass immediately prior to its extrusion is typically of at least 5° C., 10° C. or 15° C., 20° C. or even 25° C. or 30° C., 35° C. or 40° C.

The temperature of the extrudable mass immediately prior to its extrusion may be less than 50° C., in particular is less than 40° C. or even less than 35° C. or 30° C.

The extrudable mass is extruded through the extrusion head to form strand(s).

The particles may be formed from the strand(s).

The strands may be fed into a chilled roll for forming chip-form product and/or for cooling. Water, for example at a temperature of from 1 to 25° C. or from 4 to 10° C., may flows through the rolls to provide cooling.

The strands or the chip-form products may be fed in a second extruder. The strands or the chip-form products may be fed in the second extruder at a temperature of at least 10° C., 15° C. or 20° C. The strands or the chip-form products may be fed in the second extruder at a temperature of at most 45° C. or 40° C. or 35° C.

When present, the second extruder comprises an extrusion head. The extrusion head may be an axial or radial extrusion head. The extrusion head may comprise a multiplicity of extrusion apertures. The apertures may be cylindrical and may have a diameter comprised between 0.2 to 4 mm, for example between 0.4 and 3 mm or between 0.6 and 2 mm or between 0.8 and 1.5 mm. The second extruder may be a screw extruder, in particular a twin screw extruder.

When a second extruder is present, the strands or the chip-form products may be mechanically worked within the second extruder to form an extrudable mass. The extrudable mass may be in a pasty, plastic and/or semi-solid and/or solid form. The extrudable mass may in particular be in a plastic and/or semi-solid form immediately prior the extrusion in the second extruder.

The feed material may be cooled within the second extruder. The second extruder may have a cooling capability which limits the increase of temperature (due to the mechanical working of the extruder) of the fed material inside the second extruder. In at least one location inside the second extruder, the feed material may have a temperature below the temperature at which the fed material was fed into the second extruder.

The second extruder may have a cooling capability which means that the second extruder has means to cool the fed material, such means having a significantly higher cooling capability than the air at ambient temperature surrounding the second extruder. For example, the second extruder may be a water cooled extruder. The water may circulate in a jacket of the second extruder and may have a temperature between 1 and 33° C., for example between 3 and 20° C.

The feed material may be cooled of at least 1° C., or 2° C., or 3° C., or 5° C., 10° C. or 15° C., 20° C. or even 25° C. or 30° C., 35° C. or 40° C. within the second extruder. The difference of temperature between the temperature at which is fed the feed material to the second extruder and the temperature of the extrudable mass immediately prior to its extrusion is typically of at least 1° C., or 2° C., or 3° C., or 5° C., 10° C. or 15° C., 20° C. or even 25° C. or 30° C., 35° C. or 40° C. The difference of temperature between the temperature at which is fed the feed material to the first extruder and the temperature of the extrudable mass immediately prior to its extrusion in the second extruder is typically of at least 5° C., 10° C. or 15° C., 20° C. or even 25° C. or 30° C., 35° C. or 40° C.

The temperature of the extrudable mass immediately prior to its extrusion in the second extruder may be less than 50° C., in particular is less than 40° C. or even less than 35° C. or 30° C.

When a second extruder is present, the extrudable mass is extruded through the extrusion head of the second extruder to form strand(s).

The particles may be formed from the strand(s).

The particles (which may have been formed from the strand(s) formed by the first extruder or from any subsequent step of the process) may be dried, for example in a fluid bed dryer.

The particles may be grinded or sieved to give them a suitable particle size distribution and/or a suitable mean particle size. The fines and oversize particles may be used as a feed material for the first extruder, or when present the second extruder.

The particles may have an average length per number of from 0.1 mm or 1 mm or 3, 5 or 10 mm and may have a length of at most 20 or 10 or 5 mm.

The particles, in particular after a drying step, may comprise from 40 to 85% of alkyl sulfate surfactant(s). Typically the particles comprise at least 45, 50, 55, 60 or even 65% of alkyl sulfate surfactant(s). Typically the particles comprise less than 80, or 70 or less than 65% of alkyl sulfate surfactant(s).

Alkyl sulfate surfactant(s) of formula $R_2$—O—$SO_3^-$ $M^+$ may constitute at least 50, for example at least 60 or 70 or even 80 or 90% of the alkyl sulfate surfactant(s) present in the particles.

Alkyl sulfate surfactant(s) of formula $R_1$—O—$SO_3^-$ $M^+$ constitute at least 50, for example at least 60 or 70 or even 80 or 90% or 95% or 98% of the alkyl sulfate surfactant(s) present in the particles.

Alkyl sulfate surfactant(s) of formula $R_1$—O—$SO_3^-$ $M^+$ may constitute at least 50, for example at least 60 or 70 or even 80 or 90% or 95% or 98% of the alkyl sulfate surfactant(s) of formula $R_2$—O—$SO_3^-$ $M^+$ present in the particles.

The particles, in particular after a drying step, may comprise from 1 to 20% of water. Typically the particles comprise at least 2, 3, 4 or even 5% of water. Typically the particles comprise less than 15, or 12 or less than 10% of water.

The weight ratio of alkyl sulfate surfactant(s) to water in the particles, in particular after a drying step, may be comprised between 3 and 24 or between 6 and 12.

The particles, in particular after a drying step, may comprise a builder such as an inorganic salt. The particles may comprise from 0.1 to 60% or from 4 to 50, from 8 to 40, from 16 to 25, or even from 25 to 35% of builder such as an inorganic salt. The builder present in the particles may be chosen as indicated above for the builder present in the feed material.

The particles may comprise an adjunct ingredient which may be introduced in the particles through the feed material. The adjunct ingredient may also be added to the particle in a step after the extrusion process, for example, a coating may be added to the particles.

The adjunct ingredient may be chosen in the list of adjunct ingredient that can be added in the detergent composition as indicated below. The skilled person would choose the precise nature of these adjunct ingredient, and levels of incorporation thereof to insure that the desired characteristics of the particles are not altered by the presence of said adjunct.

Detergent Composition

The particles may be included in a detergent composition, such as a laundry detergent composition. The detergent composition may comprise from 0.01 to 99% of the particles, for example from 0.1 to 10% or from 0.5 to 5% or 1 to 3% of the particles.

The detergent composition is for example in particulate form, typically in free-flowing particulate form, although the composition may be in any liquid or solid form. The composition in solid form can be in the form of an agglomerate, granule, flake, extrudate, bar, tablet or any combination thereof. The solid composition can be made by methods such as dry-mixing, agglomerating, compaction, spray drying, pan-granulation, spheronization or any combination thereof. The solid composition typically has a bulk density of from 300 g/l to 1,500 g/l, typically from 500 g/l to 1,000 g/l.

The detergent composition may be in unit dose form, including tablets.

The detergent composition may be capable of cleaning and/or softening fabric during a laundering process. Typically, the detergent composition is formulated for use in an automatic washing machine or for hand-washing use.

Adjunct Components

The detergent composition comprises the particles of the invention and may comprise additional adjunct components. The precise nature of these additional adjunct components, and levels of incorporation thereof, will depend on the physical form of the composition and the nature of the operation for which it is to be used. Suitable adjunct materials include, but are not limited to, surfactants, builders, flocculating aid, chelating agents, additional dye transfer inhibitors, enzymes and enzyme stabilizers, catalytic materials, bleach activators, hydrogen peroxide, sources of hydrogen peroxide, preformed peracids, polymeric dispersing agents, clay soil removal/anti-redeposition agents, brighteners, suds suppressors, dyes, perfumes, structure elasticizing agents, fabric softeners, carriers, hydrotropes, processing aids, solvents and/or pigments. In addition to the disclosure below, suitable examples of such other adjuncts and levels of use are found in U.S. Pat. Nos. 5,576,282, 6,306,812 B1 and 6,326,348 B1 that are incorporated by reference. When one or more adjuncts are present, such one or more adjuncts may be present as detailed below:

SURFACTANT—The compositions according to the present invention may comprise a surfactant or surfactant system. The compositions may comprise from 0.01% to 90%, or from 5 to 10%, by weight of a surfactant system. The surfactant may be selected from nonionic surfactants, anionic surfactants, cationic surfactants, ampholytic surfactants, zwitterionic surfactants, semi-polar nonionic surfactants and mixtures thereof.

Anionic Surfactants

Typically, the detergent composition comprises from 1 to 50 wt % anionic surfactant, more typically from 2 to 40 wt %.

Suitable anionic surfactants typically comprise one or more moieties selected from the group consisting of carbonate, phosphate, phosphonate, sulfate, sulphonate, carboxylate and mixtures thereof. The anionic surfactant may be one or mixtures of more than one of $C_{8-18}$ alkyl sulfates and $C_{8-18}$ alkyl sulphonates, linear or branched, optionally condensed with from 1 to 9 moles of $C_{1-4}$ alkylene oxide per mole of $C_{8-18}$ alkyl sulfate and/or $C_{8-18}$ alkyl sulphonate.

Preferred anionic detersive surfactants are selected from the group consisting of: linear or branched, substituted or unsubstituted, $C_{12-18}$ alkyl sulfates; linear or branched, substituted or unsubstituted, $C_{10-13}$ alkylbenzene sulphonates, preferably linear $C_{10-13}$ alkylbenzene sulphonates; and mixtures thereof. Highly preferred are linear $C_{10-13}$ alkylbenzene sulphonates. Highly preferred are linear $C_{10-13}$ alkylbenzene sulphonates that are obtainable, preferably obtained, by sulphonating commercially available linear alkyl benzenes (LAB); suitable LAB include low 2-phenyl LAB, such as those supplied by Sasol under the tradename Isochem® or those supplied by Petresa under the tradename Petrelab®, other suitable LAB include high 2-phenyl LAB, such as those supplied by Sasol under the tradename Hyblene®.

Alkoxylated Anionic Surfactants

The composition may comprise an alkoxylated anionic surfactant. When present alkoxylated anionic surfactant will generally be present in amounts form 0.1 wt % to 40 wt %, for example from 1 wt % to 3 wt % based on the detergent composition as a whole.

Preferably, the alkoxylated anionic detersive surfactant is a linear or branched, substituted or unsubstituted $C_{12-18}$ alkyl alkoxylated sulfate having an average degree of alkoxylation of from 1 to 30, preferably from 3 to 7.

Suitable alkoxylated anionic detersive surfactants are: Texapan LEST™ by Cognis; Cosmacol AES™ by Sasol; BES151™ by Stephan; Empicol ESC70/U™; and mixtures thereof.

Non-ionic Detersive Surfactant

The compositions of the invention may comprise non-ionic surfactant. Where present the non-ionic detersive surfactant (s) is generally present in amounts of from 0.5 to 20 wt %, or from 2 wt % to 4 wt %.

The non-ionic detersive surfactant can be selected from the group consisting of: alkyl polyglucoside and/or an alkyl alkoxylated alcohol; $C_{12}$-$C_{18}$ alkyl ethoxylates, such as, NEODOL® non-ionic surfactants from Shell; $C_6$-$C_{12}$ alkyl phenol alkoxylates wherein the alkoxylate units are ethyleneoxy units, propyleneoxy units or a mixture thereof; $C_{12}$-$C_{18}$ alcohol and $C_6$-$C_{12}$ alkyl phenol condensates with ethylene oxide/propylene oxide block polymers such as Pluronic® from BASF; $C_{14}$-$C_{22}$ mid-chain branched alcohols, BA, as described in more detail in U.S. Pat. No. 6,150,322; $C_{14}$-$C_{22}$ mid-chain branched alkyl alkoxylates, BAEx, wherein x=from 1 to 30, as described in more detail in U.S. Pat. Nos. 6,153,577, 6,020,303 and 6,093,856; alkylpolysaccharides as described in more detail in U.S. Pat. No. 4,565,647, specifically alkylpolyglycosides as described in more detail in U.S. Pat. Nos. 4,483,780 and 4,483,779; polyhydroxy fatty acid amides as described in more detail in U.S. Pat. No. 5,332,528, WO 92/06162, WO 93/19146, WO 93/19038, and WO 94/09099; ether capped poly(oxyalkylated) alcohol surfactants as described in more detail in U.S. Pat. No. 6,482,994 and WO 01/42408; and mixtures thereof.

Cationic Detersive Surfactant

The composition optionally may comprise a cationic detersive surfactant. When present, preferably the composition comprises from 0.1 wt % to 10 wt %, or from 1 wt % to 2 wt % cationic detersive surfactant.

Suitable cationic detersive surfactants are alkyl pyridinium compounds, alkyl quaternary ammonium compounds, alkyl quaternary phosphonium compounds, and alkyl ternary sulphonium compounds. The cationic detersive surfactant can be selected from the group consisting of: alkoxylate quaternary ammonium (AQA) surfactants as described in more detail in U.S. Pat. No. 6,136,769; dimethyl hydroxyethyl quaternary ammonium surfactants as described in more detail in U.S. Pat. No. 6,004,922; polyamine cationic surfactants as described in more detail in WO 98/35002, WO 98/35003, WO 98/35004, WO 98/35005, and WO 98/35006; cationic ester surfactants as described in more detail in U.S. Pat. Nos. 4,228,042, 4,239,660, 4,260,529 and 6,022,844; amino surfactants as described in more detail in U.S. Pat. No. 6,221,825 and WO 00/47708, specifically amido propyldimethyl amine; and mixtures thereof.

Highly preferred cationic detersive surfactants are mono-$C_{8-10}$ alkyl mono-hydroxyethyl di-methyl quaternary ammonium chloride, mono-$C_{10-12}$ alkyl mono-hydroxyethyl di-methyl quaternary ammonium chloride and mono-$C_{10}$ alkyl mono-hydroxyethyl di-methyl quaternary ammonium chloride. Cationic surfactants such as Praepagen HY (tradename Clariant) may be useful and may also be useful as a suds booster.

BUILDER—The builder may comprise a water-insoluble or partially water-soluble builder, a water-soluble builder, or a combination thereof.

Water-insoluble or Partially Water-soluble Builder

The composition herein may comprise water-insoluble or partially water-soluble builder. Examples of largely water insoluble builders include the sodium aluminosilicates. Suitable aluminosilicate zeolites have the unit cell formula $$Na_z[(AlO_2)_z(SiO_2)_y].xH_2O$$

wherein z and y are at least 6; the molar ratio of z to y is from 1.0 to 0.5 and x is at least 5, preferably from 7.5 to 276, more preferably from 10 to 264.

The aluminosilicate material is in hydrated form and is preferably crystalline, containing from 10% to 28%, more preferably from 18% to 22% water by weight in bound form. The aluminosilicate zeolites can be naturally occurring materials, but are preferably synthetically derived. Synthetic crystalline aluminosilicate ion exchange materials are available under the designations Zeolite A, Zeolite B, Zeolite P, Zeolite X, Zeolite HS and mixtures thereof Zeolite A has the formula:

$$Na_{12}[(AlO_2)_{12}(SiO_2)_{12}].xH_2O$$

wherein x is from 20 to 30, especially 27. Zeolite X has the formula:

$$Na_{86}[(AlO_2)_{86}(SiO_2)_{106}].276 H_2O$$

Preferred crystalline layered silicates for use herein have the general formula:

$$NaMSi_xO_{2x+1}.yH_2O$$

wherein M is sodium or hydrogen, x is a number from 1.9 to 4 and y is a number from 0 to 20.

Crystalline layered sodium silicates of this type are disclosed in EP-A-0164514 and methods for their preparation are disclosed in DE-A-3417649 and DE-A-3742043. Herein, x in the general formula above preferably has a value of 2, 3 or 4 and is preferably 2. The most preferred material is $\delta$-$Na_2Si_2O_5$, available from Hoechst AG as NaSKS-6.

Water-soluble Builder

The composition herein may comprise a water-soluble builder. Preferably, the water-soluble builder comprises an alkali or alkaline earth metal salt of phosphate. Suitable examples of a water-soluble phosphate builders are the alkali metal tripolyphosphates, sodium, potassium and ammonium pyrophosphate, sodium and potassium and ammonium pyrophosphate, sodium and potassium orthophosphate, sodium polymeta/phosphate in which the degree of polymerisation ranges from about 6 to 21, and salts of phytic acid. The builder may also comprise polycarboxylic acids and salts thereof, preferably citric acid, alkali metal salts thereof, and combinations thereof.

The composition herein may comprise (by weight) from 1% to 40%, more preferably from 3%, or from 5%, or from 8%, to 25%, to 15%, or to 10% builder.

According to one specific embodiment of the invention, the composition comprises at most 5%, for example from 0.1 to 3%, or even from 0.3 to 1% of aluminosilicate(s) such as zeolite. The composition may comprise at most 5%, for example from 0.1 to 3%, or even from 0.3 to 1%, of phosphate builder(s). The composition may comprise at most 5%, for example from 0.1 to 3%, or even from 0.3 to 1%, of aluminosilicate(s) such as zeolite and phosphate builder(s).

The composition may comprise at most 15%, preferably from 3 to 12%, or even from 5 to 10%, of phosphate builder(s), aluminosilicate builder(s), polycarboxylic acid builder(s), and additional silicate builder(s) such as layered silicate builder(s).

The composition may comprise at most 15%, preferably from 3 to 12%, or even from 5 to 10%, of phosphate builder(s), aluminosilicate builder(s), polycarboxylic acid builder(s), additional silicate builder(s), and other material(s) having at a temperature of 25° C. and at a 0.1M ionic strength a calcium binding capacity superior to 50 mg/g and a calcium binding constant higher than 3.50.

FLOCCULATING AID—The composition may further comprise a flocculating aid. Typically, the flocculating aid is polymeric. Preferably the flocculating aid is a polymer comprising monomer units selected from the group consisting of ethylene oxide, acrylamide, acrylic acid and mixtures thereof. Preferably the flocculating aid is a polyethyleneoxide. Typically the flocculating aid has a molecular weight of at least 100,000 Da, preferably from 150,000 Da to 5,000,000 Da and most preferably from 200,000 Da to 700,000 Da. Preferably the composition comprises at least 0.3% by weight of the composition of a flocculating aid.

BLEACHING AGENT—The compositions of the present invention may comprise one or more bleaching agents. In general, when a bleaching agent is used, the compositions of the present invention may comprise from about 0.1% to about 50% or even from about 0.1% to about 25% bleaching agent by weight of the subject detergent composition. When present, suitable bleaching agents include bleaching catalysts, photobleaches for example Vitamin K3 and zinc or aluminium phtalocyanine sulfonate; bleach activators such as tetraacetyl ethylene diamine (TAED) and nonanoyloxybenzene sulphonate (NOBS); hydrogen peroxide; pre-formed peracids; sources of hydrogen peroxide such as inorganic perhydrate salts, including alkali metal salts such as sodium salts of perborate (usually mono- or tetra-hydrate), percarbonate, persulfate, perphosphate, persilicate salts and mixtures thereof, optionally coated, suitable coatings including inorganic salts such as alkali metal; and mixtures thereof.

The amounts of hydrogen peroxide source and peracid or bleach activator may be selected such that the molar ratio of available oxygen (from the peroxide source) to peracid is from 1:1 to 35:1, or even 2:1 to 10:1

FLUORESCENT WHITENING AGENT—If present, any fluorescent whitening agent suitable for use in a laundry detergent composition may be used in the composition of the present invention. The most commonly used fluorescent whitening agents are those belonging to the classes of diaminostilbene-sulphonic acid derivatives, diarylpyrazoline derivatives and bisphenyl-distyryl derivatives.

Preferred fluorescent whitening agents are Parawhite KX, supplied by Paramount Minerals and Chemicals, Mumbai, India; Tinopal® DMS and Tinopal® CBS available from Ciba-Geigy AG, Basel, Switzerland. Tinopal® DMS is the disodium salt of 4,4'-bis-(2-morpholino-4anilino-s-triazin-6-ylamino)stilbene disulphonate. Tinopal® CBS is the disodium salt of 2,2'-bis-(phenyl-styryl)disulphonate.

FABRIC HUEING AGENTS—dyes or pigments which when formulated in detergent compositions can deposit onto a fabric when said fabric is contacted with a wash liquor comprising said detergent compositions thus altering the tint of said fabric through absorption of visible light. Fluorescent whitening agents emit at least some visible light. In contrast, fabric hueing agents alter the tint of a surface as they absorb at least a portion of the visible light spectrum. Suitable fabric hueing agents include dyes and dye-clay conjugates, and may also include pigments. Suitable dyes include small molecule dyes and polymeric dyes. Suitable small molecule dyes include small molecule dyes selected from the group consisting of dyes falling into the Colour Index (C.I.) classifications of Direct Blue, Direct Red, Direct Violet, Acid Blue, Acid Red, Acid Violet, Basic Blue, Basic Violet and Basic Red, or mixtures thereof.

POLYMERIC DISPERSING AGENTS—The compositions of the present invention can also contain Polymeric dispersing agents. Suitable polymeric dispersing agents, include polymeric polycarboxylates, substituted (including quarternized and oxidized) polyamine polymers, and polyethylene glycols, such as: acrylic acid-based polymers having an average molecular of about 2,000 to about 10,000; acrylic/maleic-based copolymers having an average molecular weight of about 2,000 to about 100,000 and a ratio of acrylate to maleate segments of from about 30:1 to about 1:1; maleic/acrylic/vinyl alcohol terpolymers; polyethylene glycol (PEG) having a molecular weight of about 500 to about 100,000, preferably from about 1,000 to about 50,000, more preferably from about 1,500 to about 10,000; polyaspartate and polyglutamate; carboxymethylcellulose (CMC) materials; and water soluble or dispersible alkoxylated polyalkyleneamine materials. These polymeric dispersing agents, if included, are typically at levels up to about 5%, preferably from about 0.2% to about 2.5%, more preferably from about 0.5% to about 1.5%.

POLYMERIC SOIL RELEASE AGENT—The compositions of the present invention can also contain Polymeric soil release agent. Polymeric soil release agent, or "SRA", have hydrophilic segments to hydrophilize the surface of hydrophobic fibers such as polyester and nylon, and hydrophobic segments to deposit upon hydrophobic fibers and remain adhered thereto through completion of washing and rinsing cycles, thereby serving as an anchor for the hydrophilic segments. This can enable stains occurring subsequent to treatment with the SRA to be more easily cleaned in later washing procedures. Preferred SRA's include oligomeric terephthalate esters; sulfonated product of a substantially linear ester oligomer comprised of an oligomeric ester backbone of terephthaloyl and oxyalkyleneoxy repeat units and allyl-derived sulfonated terminal moieties covalently attached to the backbone; nonionic end-capped 1,2-propylene/polyoxyethylene terephthalate polyesters; an oligomer having empirical formula $(CAP)_2 (EG/PG)_5 (T)_5 (SIP)_1$ which comprises terephthaloyl (T), sulfoisophthaloyl (SIP), oxyethyleneoxy and oxy-1,2-propylene (EG/PG) units and which is preferably terminated with end-caps (CAP), preferably modified isethionates, as in an oligomer comprising one sulfoisophthaloyl unit, 5 terephthaloyl units, oxyethyleneoxy and oxy-1,2-propyleneoxy units in a defined ratio, preferably about 0.5:1 to about 10:1, and two-end-cap units derived from sodium 2-(2-hydroxyethoxy)-ethanesulfonate; oligomeric esters comprising: (1) a backbone comprising (a) at least one unit selected from the group consisting of dihydroxy sulfonates, polyhydroxy sulfonates, a unit which is at least trifunctional whereby ester linkages are formed resulting in a branched oligomer backbone, and combinations thereof; (b) at least one unit which is a terephthaloyl moiety; and (c) at least one unsulfonated unit which is a 1,2-oxyalkyleneoxy moiety; and (2) one or more capping units selected from nonionic capping units, anionic capping units such as alkoxylated, preferably ethoxylated, isethionates, alkoxylated propanesulfonates, alkoxylated propanedisulfonates, alkoxylated phenolsulfonates, sulfoaroyl derivatives and mixtures thereof. Preferred are esters of the empirical formula:

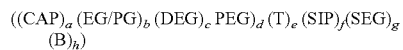

wherein CAP, EG/PG, PEG, T and SIP are as defined hereinabove, DEG represents di(oxyethylene)oxy units, SEG represents units derived from the sulfoethyl ether of glycerin and related moiety units, B represents branching units which are at least trifunctional whereby ester linkages are formed resulting in a branched oligomer backbone, a is from about 1 to about 12, b is from about 0.5 to about 25, c is from 0 to about 12, d is from 0 to about 10, b+c+d totals from about 0.5 to about 25, e is from about 1.5 to about 25, f is from 0 to about 12; e+f totals from about 1.5 to about 25, g is from about 0.05 to about 12; h is from about 0.01 to about 10, and a, b, c, d, e, f, g, and h represent the average number of moles of the corresponding units per mole of the ester; and the ester has a molecular weight ranging from about 500 to about 5,000; and; cellulosic derivatives such as the hydroxyether cellulosic polymers available as METHOCEL® from Dow; the $C_1$-$C_4$ alkyl celluloses and $C_4$ hydroxyalkyl celluloses, see U.S. Pat. No. 4,000,093, issued Dec. 28, 1976 to Nicol et al., and the methyl cellulose ethers having an average degree of substitution (methyl) per anhydroglucose unit from about 1.6 to about 2.3 and a solution viscosity of from about 80 to about 120 centipoise measured at 20° C. as a 2% aqueous solution. Such materials are available as METOLOSE SM100® and METOLOSE SM200®, which are the trade names of methyl cellulose ethers manufactured by Shinetsu Kagaku Kogyo KK.

ENZYMES—The compositions can comprise one or more enzymes which provide cleaning performance and/or fabric care benefits. Examples of suitable enzymes include, but are not limited to, hemicellulases, peroxidases, proteases, other cellulases, xylanases, lipases, phospholipases, esterases, cutinases, pectinases, mannanases, pectate lyases, keratinases, reductases, oxidases, phenoloxidases, lipoxygenases, ligninases, pullulanases, tannases, pentosanases, malanases, β-glucanases, arabinosidases, hyaluronidase, chondroitinase, laccase, and amylases, or mixtures thereof. In a preferred embodiment, the compositions of the present invention will further comprise a lipase, for further improved cleaning and whitening performance. A typical combination is an enzyme cocktail that may comprise, for example, a protease and lipase in conjunction with amylase. When present in the detergent composition, the aforementioned enzymes may be present at levels from about 0.00001% to about 2%, from about 0.0001% to about 1% or even from about 0.001% to about 0.5% enzyme protein by weight of the composition.

ENZYME STABILIZERS—Enzymes for use in detergents can be stabilized by various techniques. The enzymes employed herein can be stabilized by the presence of water-soluble sources of calcium and/or magnesium ions in the finished compositions that provide such ions to the enzymes. In case of aqueous compositions comprising protease, a reversible protease inhibitor, such as a boron compound, can be added to further improve stability.

CATALYTIC METAL COMPLEXES—The compositions of the invention may comprise catalytic metal complexes. When present, one type of metal-containing bleach catalyst is a catalyst system comprising a transition metal cation of defined bleach catalytic activity, such as copper, iron, titanium, ruthenium, tungsten, molybdenum, or manganese cations, an auxiliary metal cation having little or no bleach catalytic activity, such as zinc or aluminum cations, and a sequestrate having defined stability constants for the catalytic and auxiliary metal cations, particularly ethylenediaminetetraacetic acid, ethylenediaminetetra(methylenephosphonic acid) and water-soluble salts thereof. Such catalysts are disclosed in U.S. Pat. No. 4,430,243.

SOLVENTS—Suitable solvents include water and other solvents such as lipophilic fluids. Examples of suitable lipophilic fluids include siloxanes, other silicones, hydrocarbons, glycol ethers, glycerine derivatives such as glycerine ethers, perfluorinated amines, perfluorinated and hydrofluoroether solvents, low-volatility nonfluorinated organic solvents, diol solvents, other environmentally-friendly solvents and mixtures thereof. The composition may comprise at most 20%, especially at most 5% of water.

SOFTENING SYSTEM—the compositions of the invention may comprise a softening agent and optionally also with flocculants and enzymes; optionally for softening through the wash.

FABRIC SOFTENING BOOSTING COMPONENT—Typically, the composition additionally comprises a charged polymeric fabric-softening boosting component.

COLORANT—the compositions of the invention may comprise a colorant, preferably a dye or a pigment. Particularly, preferred dyes are those which are destroyed by oxidation during a laundry wash cycle. To ensure that the dye does not decompose during storage it is preferable for the dye to be stable at temperatures up to 40° C. The stability of the dye in the composition can be increased by ensuring that the water content of the composition is as low as possible. If possible, the dyes or pigments should not bind to or react with textile fibres. If the colorant does react with textile fibres, the colour imparted to the textiles should be destroyed by reaction with the oxidants present in laundry wash liquor. This is to avoid coloration of the textiles, especially over several washes. Particularly, preferred dyes include but are not limited to Basacid® Green 970 from BASF and Monastral blue from Albion.

Detergent Composition

The detergent composition is for example in particulate form, typically in free-flowing particulate form, although the composition may be in any liquid or solid form. The composition in solid form can be in the form of an agglomerate, granule, flake, extrudate, bar, tablet or any combination thereof. The solid composition can be made by methods such as dry-mixing, agglomerating, compaction, spray drying, pan-granulation, spheronization or any combination thereof. The solid composition typically has a bulk density of from 300 g/l to 1,500 g/l, typically from 500 g/l to 1,000 g/l.

The detergent composition may be in unit dose form, including tablets.

The detergent composition may be capable of cleaning and/or softening fabric during a laundering process. Typically, the detergent composition is formulated for use in an automatic washing machine or for hand-washing use.

In the present description of the invention, percentages and ratios are to be understood as weight percentages and weight ratios unless otherwise specified.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm".

The following examples are given by way of illustration only and therefore should not be construed to limit the scope of the invention.

EXAMPLES

In the following examples, the extruder is a Twin-Screw Extruder from Sunup (Type # SET-60(Q)). The barrel diameter is 60 mm and the length is 250 mm. The alkyl sulfate paste is a paste comprising 70% of $C_{12-14}$ alkyl sulfate and 30% of water and prepared by sulphating $C_{12-14}$ alcohol.

Example 1

Process for Manufacturing Particles

The feed material is prepared by mixing 78% of the alkyl sulfate paste in a molten state at the temperature of 60° C., 21.8% of Sodium carbonate at the temperature of 20° C., and 0.2% of blue pigment at the temperature of 20° C. The warm feed material as a temperature of about 50° C. and is gradually fed into the extruder and extruded at 50 rpm though a 0.6 mm dye plate. During the extrusion process cold water (12-18° C.) flows through the jacket of the extruder to provide cooling. The resulting temperature of the extruded material at the moment of extrusion is around 35° C. (the temperature may be measured via laser thermometer). The resulting particles are non-sticky and free flowing.

Example 2

Process for Manufacturing Particles

The feed material is prepared by mixing 59% of the alkyl sulfate paste in a molten state at the temperature of 60° C., 40.8% of Sodium carbonate at the temperature of 20° C., and 0.2% of blue pigment at the temperature of 20° C. The warm feed material is gradually fed into the extruder and extruded at 50 rpm though a 0.6 mm dye plate. During the extrusion process cold water (12-18° C.) flows through the jacket of the extruder to provide cooling. The resulting temperature of the extruded material at the moment of extrusion is around 39° C. (the temperature may be measured via laser thermometer). The resulting particles are non-sticky and free flowing.

Example 3

Process for Manufacturing Particles

The feed materials is prepared by mixing 78% of alkyl sulfate paste in a molten state at the temperature of 60° C., 21.8% of Sodium carbonate at the temperature of 20° C., and 0.2% of blue pigment at the temperature of 20° C. The warm feed material is fed into a 1st extruder (Sunup type) for mixing and extruded at 50 rpm though a 10 mm die plate. During the mixing process cold water (12-18° C.) flows through the jacket of the extruder to provide cooling. The mixture is extruded through the extrusion head to form strand (s) with a temperature of 45-55° C. Then the strands are fed into a chilled roll for cooling. Cold water (4-10° C.) flows through the rolls to provide cooling. The resulting mixture is in flake form with a temperature of around 20 to 35° C. Then the cooled flakes are fed into 2nd extruder (Sunup type) and extruded at 50 rpm though a 0.8 mm dye plate. During the extrusion process cold water (12-18° C.) flows through the jacket of the extruder to provide cooling. The resulting temperature of the extruded material at the moment of extrusion is about 25-35° C. (the temperature may be measured via laser thermometer). The resulting particles are non-sticky and free flowing.

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A process for manufacturing particles, the process consisting of the steps of:
    a) feeding a feed material comprising from 55% to 60% of alkyl sulfate surfactant(s) and from 17% to 26% of water into a first extruder comprising an extrusion head,
    b) mechanically working and cooling the feed material within the first extruder to form an extrudable mass,
    c) extruding the extrudable mass through the extrusion head to form a strand(s),
    d) feeding the extruded material to a second extruder comprising an extruder head,
    e) mechanically working and cooling the feed material within the second extruder to form an extrudable mass,
    f) extruding the extrudable mass through the extruder head to form strand(s),
    g) forming particles from the strand(s),
    wherein the alkyl sulfate surfactant(s) comprises at least 85%, by weight of alkyl sulfate surfactant(s) of formula $R_1-O-SO_3^- M^+$, with $R_1$ being a linear or branched, substituted or unsubstituted, optionally alkoxylated, $C_6$-$C_{14}$ alkyl and with $M^+$ being a proton or a cation which provides charge neutrality; and
    further wherein the feed material further comprises sodium carbonate and/or sodium sulfate; and
    further wherein the feed material is fed to the first extruder at a temperature comprised between 55° C. and 80° C. and the temperature of the extrudable mass immediately prior to its extrusion is less than 50° C., and
    h) subsequently drying the particles.

2. The process according to claim 1, wherein the difference of temperature between the temperature at which is fed the feed material to the extruder and the temperature of the extrudable mass immediately prior to its extrusion is at least 20° C.

* * * * *